US006869473B2

(12) United States Patent
Comrie

(10) Patent No.: US 6,869,473 B2
(45) Date of Patent: Mar. 22, 2005

(54) CEMENTICIOUS MATERIALS INCLUDING STAINLESS STEEL SLAG AND GEOPOLYMER

(76) Inventor: Douglas Comrie, 18 Alpine Way, Shanty Bay Ontario (CA), L0L 2L0

( * ) Notice: Subject to any disclaimer, the term of this patent is extended or adjusted under 35 U.S.C. 154(b) by 0 days.

(21) Appl. No.: 10/769,147

(22) Filed: Jan. 30, 2004

(65) Prior Publication Data

US 2004/0255823 A1 Dec. 23, 2004

Related U.S. Application Data

(60) Provisional application No. 60/444,274, filed on Jan. 31, 2003.

(51) Int. Cl.[7] .......................... C04B 14/00; C04B 18/06

(52) U.S. Cl. ....................... 106/697; 106/714; 106/789; 106/790

(58) Field of Search ................................ 106/697, 714, 106/789, 790, 707, 713

(56) References Cited

U.S. PATENT DOCUMENTS 5,820,668 A * 10/1998 Comrie ....................... 106/600

* cited by examiner

*Primary Examiner*—Elizabeth D. Wood
(74) *Attorney, Agent, or Firm*—Lara A. Northrop, Esq.; Alan G. Towner, Esq.; Pietragallo, Bosick & Gordon

(57) ABSTRACT

Cementicious materials including stainless steel slag and geopolymer can be added to conventional cement compositions, such as Portland cement, as a partial or total replacement for conventional cement materials. The stainless steel slag may comprise silicates and/or oxides of calcium, silicon, magnesium, iron, aluminum, maganese, titanium, sulfur, chromium and/or nickel. The geopolymer may comprise aluminum silicate and/or magnesium silicate.

45 Claims, No Drawings

CEMENTICIOUS MATERIALS INCLUDING STAINLESS STEEL SLAG AND GEOPOLYMER

FIELD OF THE INVENTION

The present invention relates to cementicious materials, and more particularly relates to the use of mixtures of stainless steel slag and a geopolymer as partial or total substitutes for cements for use in concrete and the like.

BACKGROUND INFORMATION

Portland cements are hydraulic cements that chemically react and harden with the addition of water. Portland cement contains limestone, clay, cement rock and iron ore blended and heated to a temperature of about 2600–3000° F. The resulting product is subsequently ground to a powder consistency and mixed with gypsum to control setting time. Portland cement is used in many architectural, masonry and construction applications, most notably as concrete for roads, runways, slabs, floors, walls, precast structures and the like.

Architectural and construction applications such as roads, bridges, commercial and residential buildings and waterway systems that require a significant amount of cement-based concrete would benefit from a lower cost cementicious material that reduces or eliminates the dependency on the availability of limestone, clay, cement rock and iron ore. For example, U.S. Pat. No. 5,820,668, which is incorporated herein by reference, discloses inorganic binder compositions that may be used as partial substitutes or total replacements for Portland cement for such applications. The inorganic binder compositions include materials such as fly ash, $Al_2O_3$, pozzolan, nephelene syenite, aluminum silicate, sodium hydroxide, silicic acid, potassium salt and sodium salt.

Architectural and construction applications that are subjected to increased fatigue stresses, acid rain and/or road salt, such as roads, bridges, transportation facilities and high-rise applications, would further benefit from a cementicious material having improved durability, acid resistance and improved rapid chloride ion penetrability. With the growing popularity of cement-alternative compositions and the desire to re-use manufacturing by-products such as stainless steel slag, a cementicious material that incorporates a manufacturing by-product material and exhibits improved properties is highly desirable. Accordingly, a need remains for a cost effective environmentally friendly cementicious material that incorporates stainless steel slag and exhibits improved durability, acid resistance and improved rapid chloride ion penetrability.

The present invention has been developed in view of the foregoing.

SUMMARY OF THE INVENTION

The present invention is directed to a cementicious material including stainless steel slag and geopolymer that can be added to conventional hydraulic cement compositions, such as Portland cement, as a partial or total replacement for conventional cement materials.

It is an aspect of the present invention to provide a cementicious material comprising a geopolymer and stainless steel slag.

It is another aspect of the present invention to provide a cementicious material comprising hydraulic cement, stainless steel slag and a geopolymer.

It is another aspect of the present invention to provide a reacted mixture of a geopolymer, stainless steel slag and water.

It is yet another aspect of the present invention to provide a method of making reacted cementicious material, the method comprising combining hydraulic cement, stainless steel slag, geopolymer and water.

These and other aspects of the present invention will be more apparent from the following description.

DETAILED DESCRIPTION

The cementicious materials of the present invention include stainless steel slag and geopolymer. As used herein, the term "cementicious material" means a water-activated binding material that hardens subsequent to or simultaneous with activation. Mixtures of stainless steel slag and geopolymer may be added to conventional hydraulic cement compositions, such as Portland cement, as partial substitutes for conventional cement materials. Alternatively, the stainless steel slag and geopolymer mixtures may be used as total replacements for conventional cement materials.

Stainless steel slag is a by-product of the stainless steelmaking process. The production of stainless steel requires that certain alloying elements must be added to a molten steel composition. Impurities resulting from the added alloying elements and any impurities present in the molten steel composition are removed from the stainless steel production furnace to produce a commercial grade stainless steel. Stainless steel slag comprises the impurities from the steel and/or additional alloying elements removed as by-products from the stainless steel production furnace. The slag typically occurs as a molten liquid melt and is a complex solution of silicates and oxides that solidify upon cooling. The stainless steel slag may comprise silicates, oxides and other compounds of calcium, silicon, magnesium, iron, aluminum, manganese, titanium, sulfur, chromium and nickel. For example, the stainless steel slag may comprise calcium silicate and/or calcium oxide. In one embodiment, the stainless steel slag may comprise from about 80 to about 99 weight percent calcium silicate. A typical stainless steel slag composition may comprise from about 0.2 weight percent to about 50 weight percent Ca; from about 0.5 weight percent to about 65 weight percent Si; from about 0.1 weight percent to about 5 weight percent Mg; from about 0.1 weight percent to about 6 weight percent Fe; from about 1 weight percent to about 40 weight percent Al; from about 0.1 weight percent to about 1 weight percent Mn; from about 0.1 weight percent to about 0.5 weight percent Ti; from about 0.01 weight percent to about 2.5 weight percent S; from about 0.3 weight percent to about 5 weight percent Cr; and from about 0.01 weight percent to about 1 weight percent Ni. In another embodiment, the stainless steel slag may comprise 30 weight percent Ca; 12 weight percent Si; 7 weight percent Mg; 4 weight percent Fe; 3 weight percent Al; 1 percent Mn; 0.5 weight percent Ti; 0.2 weight percent Cr and 0.04 weight percent Ni.

The stainless steel slag may be cooled and provided in relatively fine particulate form. If desired, grinding or milling may be used to reduce the particle size of the slag, e.g., to a size approximating the particle size of Portland cement. In one embodiment, the stainless steel slag has an average particle size of from about 100%–200 mesh to about 45%–325 mesh. Preferably, the stainless steel slag has an average particle size of from about 80%–325 mesh to about 95%–325 mesh. In one embodiment, the stainless steel slag has an average particle size of less than about 100 micrometers. In another embodiment, the stainless steel slag has an average particle size of from about 1 micrometer to about 50 micrometers. The stainless steel slag may be provided in the form of a gray powder having a typical specific gravity of about 2.8.

In addition to stainless steel slag, the present cementicious materials include a geopolymer. As used herein, the term "geopolymer" includes amorphous to semi-crystalline materials comprising aluminum silicate and/or magnesium silicate either as a solid or when reacted with water. The geopolymer may be provided as a powder, a liquid or as a powder and a liquid that must be combined. One type of geopolymer comprises pozzolan, anhydrous aluminum silicate, silicic acid and a potassium and/or sodium salt. Pozzolan typically comprises aluminum oxide and silicon oxide. Another type of geopolymer comprises fly ash, pozzolan, silicic acid and a potassium and/or sodium salt. Another type of geopolymer comprises pozzolan, nephelene cyanite, hydrous aluminum silicate, hydrous sodium hydroxide, silicic acid and potassium and/or sodium salt. Yet another type of geopolymer comprises fly ash, fumed silica and aluminum oxide.

One type of geopolymer comprises from about 5 to about 20 weight percent fumed silica or pozzolan; from about 40 to about 60 weight percent anhydrous aluminum silicate; from about 1 to about 25 weight percent silicic acid; and from about 1 to about 25 weight percent potassium salt and/or sodium salt. In another embodiment, the geopolymer may further include a poly(sialate) and/or a poly(sialate-siloxo) admixed with one or more of: fly ash F; fly ash C; fumed silica; $Al_2O_3$; pozzolan; nephelene cyanite; anhydrous aluminum silicate; hydrous aluminum silicate; hydrous sodium hydroxide; silicic acid; potassium salt; and sodium salt to form a poly(sialate) and/or poly(sialate-siloxo) admixture. In another embodiment, the geopolymer comprises from about 3 weight percent to about 15 weight percent poly(sialate) and/or poly(sialate-siloxo) admixture. In yet another embodiment, the geopolymer comprises from about 10 weight percent to about 15 weight percent poly (sialate) and/or poly(sialate-siloxo) admixture. Some examples of geopolymers are listed in Examples 1–5 below. In some of the examples, the geopolymer is provided as a solid powder constituent, in other examples the geopolymer is provided in part as a solid powder constituent and in part a liquid constituent. For example, geopolymers comprising silicic acid and potassium and/or sodium salt typically comprise these constituents in liquid form. The values listed in Examples 1–5 are weight percentages.

EXAMPLE 1

4–10% pozzolan;

5–10% anhydrous aluminum silicate;

1–5% silicic acid; and

1–5% potassium salt.

EXAMPLE 2

5–20% fly ash C;

4–10% pozzolan;

1–5% silicic acid; and

1–5% potassium and/or sodium salt.

EXAMPLE 3

4–10% pozzolan;

4–10% nephelene cyanite;

1–5% hydrous aluminum silicate;

1–5% hydrous sodium hydroxide;

1–5% silicic acid; and

1–5% potassium and/or sodium salt.

EXAMPLE 4

5–20% fly ash F;

4–10% fumed silica; and

1–8% $Al_2O_3$.

EXAMPLE 5

4–10% pozzolan;

5–10% anhydrous aluminum silicate;

1–5% silicic acid; and

1–5% sodium salt.

In one embodiment, the amounts of the geopolymer constituents listed in Examples 1–5 may be combined with desired amounts of stainless steel slag to form a slag-geopolymer mixture and combined with water in order to produce the cementicious material of the present invention. In another embodiment, the amounts of geopolymer constituents listed in Examples 1–5 may be combined with desired amounts of stainless steel slag, water and conventional cement (e.g., Portland cement) in order to produce the cementicious material of the present invention. The weight percentages listed in Examples 1–5 represent the geopolymer portion of the cementicious material, with the balance comprising stainless steel slag and optionally conventional cement, aggregate and/or other materials.

The amounts of geopolymer and stainless steel slag present in the slag-geopolymer mixture are listed below in Table 1. The values listed in Table 1 are weight percentages.

TABLE 1

Stainless Steel Slag-Geopolymer Mixture

| | Geopolymer (wt %) | Stainless Steel Slag (wt %) |
|---|---|---|
| Typical Range | 1–99.9 | 0.1–99 |
| Preferred Range | 5–95 | 5–95 |
| More Preferred Range | 10–50 | 50–90 |
| Most Preferred Range | 15–40 | 60–85 |

According to one embodiment of the invention, the slag-geopolymer mixture may be added to a conventional hydraulic cement material, such as Portland cement, to form a cement-slag-geopolymer mixture. The Portland cement may comprise about 20 weight percent silicon dioxide; about 60 weight percent tri-calcium silicate; about 10 weight percent di-calcium silicate; about 6 weight percent tri-calcium aluminate; about 1 weight percent aluminum oxide; about 1 weight percent ferric oxide; about 1 weight percent magnesium oxide; and about 1 weight percent sulphur tri-oxide. The cement material may also comprise any composition conventionally known in the art. Portland cement, or any other suitable type of cement, may be combined with the slag-geopolymer mixture in the weight percentages listed in Table 2.

TABLE 2

| Cement-Slag-Geopolymer Mixture | | |
|---|---|---|
| | Portland Cement (wt %) | Slag-Geopolymer Mixture (wt %) |
| Typical Range | 0–99.99 | 0.01–100 |
| Preferred Range | 20–90 | 10–80 |
| More Preferred Range | 40–85 | 15–60 |
| Most Preferred Range | 50–80 | 20–50 |

The cement-slag-geopolymer material listed in Table 2 may be combined with water and used as a binder material for any suitable application. For example, the cementicious material may be combined with sand and/or aggregate to form a concrete mixture. As used herein the term "aggregate" can include stone, gravel and/or ground granulated blast furnace slag. Any suitable ratio of cement-slag-geopolymer material to sand and/or aggregate that corresponds to suitable ratios of cement to sand and/or aggregate typically known in the art may be used. In one embodiment, the concrete material may comprise from about 10 weight percent to about 30 weight percent cement-slag-geopolymer mixture, with the remainder comprising sand, aggregate and/or other additional ingredients such as plasticizers and fibers. In another embodiment, the concrete material may comprise from about 10 weight percent to about 20 weight percent cement-slag-geopolymer mixture. A typical ratio of sand to aggregate in concrete mixtures is about 2:3. A typical ratio of sand and/or aggregate to cement-slag-geopolymer mixture is from about 6:1 to about 3:1. However, any other suitable ratio of sand and aggregate may be used.

Any plasticizer typically known in the art may be used, however, a particularly preferred plasticizer is Adva 100 manufactured by Grace Products. When a plasticizer is added, it may be added in an amount of from about 4 to about 10 ml of plasticizer per kilogram of cement-slag-geopolymer mixture. In one embodiment, ground granulated blast furnace slag may be added in an amount of from about 15 weight percent to about 50 weight percent. Ground granulated blast furnace slag is slag produced from a primary blast furnace that is typically quenched with water, pelletized and re-quenched with water. Water may also be added to the cement-slag-geopolymer mixture in any desired amount, for example, in one embodiment, the ratio of water to cement-slag-geopolymer mixture may be from about 0.3:1 to about 0.6:1.

Concrete materials including various cementicious materials in accordance with embodiments of the present invention were made and tested in the following Examples. In Examples 6–9, geopolymer, stainless steel slag and Portland cement, each having approximately the same particle size, were mixed together in a blending apparatus to form a dry mixture. Dry sand and stone were then introduced and combined with the dry mixture and water was added to the mixture to form a slurry. The ratio of the water to the cement-slag-geopolymer mixture was about 0.35:1. The slurry was mixed for three minutes and injected into tube molds having a diameter of 4 inches and a height of 8 inches. The tubes were then cured by air-drying for a period of 28 days and strength measurements were taken at various times during the curing period as set forth in Examples 6–9.

EXAMPLE 6

In Example 6, a first set of three concrete formulations was tested in a Triaxial Compressive Machine to obtain strength measurements after 24 hours of air-drying cure time. The formulation in each tube replaced a percentage of Portland cement typically required to form concrete with a slag-geopolymer mixture. Each of the tubes comprised a slag-geopolymer mixture comprising 10% geopolymer and stainless steel slag at 41%–325 mesh. The cement-slag-geopolymer content of the samples was about 13.5% by weight.

The first tube comprised a cement-slag-geopolymer composition comprising 70% Portland cement and 30% slag-geopolymer mixture. The first tube recorded a strength measurement of 52.02 MPa after a 24-hour curing time. The second tube comprised a cement-slag-geopolymer composition comprising 65% Portland cement and 35% slag-geopolymer mixture. The second tube recorded a strength measurement of 54.29 MPa after a 24-hour curing time. The third tube comprised a cement-slag-geopolymer composition comprising 60% Portland cement and 40% slag-geopolymer mixture. The third tube recorded a strength measurement of 50.00 MPa after a 24-hour curing time.

A second set of three tubes having the identical formulations as the first set was also tested to obtain strength measurements after 28 days of curing time. The first tube tested after the 28 day curing time recorded a strength measurement of 58.56 MPa. The second tube tested after the 28 day curing time recorded a strength measurement of 60.54 MPa. The third tube tested after the 28 day curing time recorded a strength measurement of 52.22 MPa. Cement compositions using 100% Portland cement and 0% slag-geopolymer mixture typically have a strength of about 18.5 MPa after a 24 hour curing period and a strength of about 48.9 MPa after a 28 day curing period. The results of Example 6 are shown below in Table 3.

TABLE 3

| High Early Strength Concrete With Partial Substitutes for Portland Cement | | | |
|---|---|---|---|
| % Slag-Geopolymer Mixture | % Portland Cement | 24 Hour Strength (MPa) | 28 Day Strength (MPa) |
| 30 | 70 | 52.02 | 58.56 |
| 35 | 65 | 54.29 | 60.54 |
| 40 | 60 | 50.00 | 52.22 |

EXAMPLE 7

In Example 7, the strength of a concrete composition comprising 100% Portland cement was measured and compared to the strength of a concrete composition comprising 75% Portland cement and a slag-geopolymer mixture having 5 weight percent geopolymer and 20 weight percent stainless steel slag. Tubes having the above described compositions were measured after 24 hours of curing time, 4 days of curing time, 7 days of curing time and 28 days of curing time. The cement-slag-geopolymer content of each tube was about 15% by weight. The results of Example 7 are shown below in Table 4.

TABLE 4

| Normal Strength Concrete Comprising 100% Portland Cement vs. Concrete Comprising 5% Geopolymer plus 20% Stainless Steel Slag | | | | |
|---|---|---|---|---|
| Cementicious Material | 24 Hour Strength (MPa) | 4 day Strength (MPa) | 7 day Strength (MPa) | 28 day Strength (MPa) |
| 25% Portland Cement and 5% Geopolymer Plus 20% Stainless Steel Slag Composition | 17.0 | 35.0 | 40.0 | 52.8 |
| 100% Portland Cement Composition | 18.5 | 38.3 | 41.3 | 48.9 |

EXAMPLE 8

In Example 8, the strength of a first concrete composition comprising 60% Portland cement and 40% ground granulated blast furnace slag was measured and compared to the strength of a second concrete composition comprising 50% Portland cement and a slag-geopolymer composition having 10% geopolymer and 40% stainless steel slag. Tubes having the above described first and second compositions were measured after 24 hours of curing time, 3 days of curing time, 7 days of curing time and 28 days of curing time. The cement-slag-geopolymer content of each tube was about 17% by weight. The results of Example 8 are shown below in Table 5.

TABLE 5

| Medium Strength Concrete: 50% Portland Cement and 10% Geopolymer with 40% Stainless Steel Slag vs. 60% Portland Cement with 40% Ground Granulated Blast Furnace Slag | | | | |
|---|---|---|---|---|
| Cementicious Material | 24 Hour Strength (MPa) | 3 day Strength (MPa) | 7 day Strength (MPa) | 28 day Strength (MPa) |
| 50% Portland Cement with 10% Geopolymer Plus 40% Stainless Steel Slag | 17.0 | 35.5 | 40.5 | 63.7 |
| 60% Portland cement with 40% Ground Granulated Blast Furnace Slag | 8.5 | 22.1 | 37.9 | 64.3 |

EXAMPLE 9

In Example 9, the strength of a first concrete composition comprising 100% Portland cement and 10 ml plasticizer per kg cement was measured and compared to the strength of a second concrete composition comprising 62.5% Portland cement and a slag-geopolymer composition having 12.5% geopolymer and 25% stainless steel slag. Tubes having the above described first and second compositions were measured after 24 hours of curing time, 3 days of curing time, 7 days of curing time and 28 days of curing time. The cement-slag-geopolymer content of each tube was about 17% by weight. The results of Example 9 are shown below in Table 6.

TABLE 6

| High Ultimate Strength Concrete: 12.5% Geopolymer plus 25% stainless steel slag vs. Normal Portland cement with plasticizer | | | | |
|---|---|---|---|---|
| Cementicious Material | 24 Hour Strength (MPa) | 3 day Strength (MPa) | 7 day Strength (MPa) | 28 day Strength (MPa) |
| 62.5% Portland Cement with 12.5% Geopolymer plus 25% Stainless Steel Slag | 29.4 | 39.2 | 55.0 | 70.0 |
| 100% Portland Cement | 22.0 | 39.0 | 44.0 | 58.0 |

EXAMPLE 10

In Example 10, two concrete formulations were each tested after curing for a period of 28 days by placing each of the tubes in a saline cell comprising distilled water and a saturated sodium chloride solution. A current was passed across each sample and the conductivity, or rapid chloride ion penetrability, was measured. The first formulation comprised 65% Portland cement with 10% Geopolymer and 25% stainless steel slag and the second formulation comprised 100% Portland cement. The cementicious content of the samples was about 17% by weight. The results of Example 10 are shown below in Table 7.

TABLE 7

| Rapid Chloride Ion Penetration: 65% Portland cement with 10% Geopolymer and 25% Stainless Steel Slag vs. 100% Portland Cement | |
|---|---|
| Cementicious Materials | Coulombs Passed After 28 day Curing Period |
| 65% Portland Cement with 10% Geopolymer and 25% Stainless Steel Slag | 650 – rating = very low |
| 100% Portland Cement | 4900 – rating = high |

Whereas particular embodiments of this invention have been described above for purposes of illustration, it will be evident to those skilled in the art that numerous variations of the details of the present invention may be made without departing from the invention as defined in the appended claims.

What is claimed is:

1. A cementicious material comprising a geopolymer and stainless steel slag.

2. The cementicious material of claim 1, wherein the material is provided in the form of an unreacted mixture of the geopolymer and the stainless steel slag.

3. The cementicious material of claim 1, wherein the geopolymer comprises aluminum silicate.

4. The cementicious material of claim 1, wherein the geopolymer comprises magnesium silicate.

5. The cementicious material of claim 1, wherein the geopolymer comprises pozzolan, anhydrous aluminum silicate, silicic acid and a salt comprising potassium salt and/or sodium salt.

6. The cementiciuos material of claim 5, wherein the geopolymer comprises from about 4 to about 10 weight percent of the pozzolan, from about 5 to about 10 weight percent of the anhydrous aluminum silicate, from about 1 to about 5 weight percent of the silicic acid and from about 1 to about 5 weight percent of the potassium salt and/or sodium salt.

7. The cementicious material of claim 1, wherein the geopolymer comprises fumed silica, anhydrous aluminum silicate, silicic acid and a salt comprising potassium salt and/or sodium salt.

8. The cementicious material of claim 7, wherein the geopolymer comprises from about 5 to about 20 weight percent of the fumed silica, from about 40 to about 60 weight percent of the anhydrous aluminum silicate, from about 1 to about 25 weight percent of the silicic acid, and from about 1 to about 25 weight percent of the potassium and/or sodium salt.

9. The cementicious material of claim 1, wherein the geopolymer comprises fly ash, pozzolan, silicic acid and a salt comprising potassium salt and/or sodium salt.

10. The cementiciuos material of claim 9, wherein the geopolymer comprises from about 5 to about 20 weight percent of the fly ash C, from about 4 to about 10 weight percent of the pozzolan, from about 1 to about 5 weight percent of the silicic acid and from about 1 to about 5 weight percent of the potassium and/or sodium salt.

11. The cementicious material of claim 1, wherein the geopolymer comprises pozzolan, nephelene cyanite, hydrous aluminum silicate, hydrous sodium hydroxide, silicic acid and a salt comprising potassium salt and/or sodium salt.

12. The cementicious material of claim 11, wherein the geopolymer comprises from about 4 to about 10 weight percent of the pozzolan, from about 4 to about 10 weight percent of the nephelene cyanite, from about 1 to about 5 weight percent of the hydrous aluminum silicate, from about 1 to about 5 weight percent of the hydrous sodium hydroxide, from about 1 to about 5 weight percent of the silicic acid and from about 1 to about 5 weight percent of the potassium and/or sodium salt.

13. The cementicious material of claim 1, wherein the geopolymer comprises fly ash, fumed silica and aluminum oxide.

14. The cementicious material of claim 13, wherein the geopolymer comprises from about 5 to about 20 weight percent of the fly ash F, from about 4 to about 10 weight percent of the fumed silica, and from about 1 to about 8 weight percent of the aluminum oxide.

15. The cementicious material of claim 1, wherein the geopolymer is provided from solid and liquid constituents.

16. The cementicious material of claim 1, wherein the geopolymer is provided from solid constituents.

17. The cementicious material of claim 1, wherein the geopolymer further comprises a polysialate and/or a polysialate-siloxo.

18. The cementicious material of claim 1, wherein the stainless steel slag comprises a calcium-containing compound.

19. The cementicious material of claim 18, wherein the stainless steel slag further comprises a silicon-containing compound.

20. The cementicious material of claim 18, wherein the calcium-containing compound is calcium silicate.

21. The cementicious material of claim 19, wherein the stainless steel slag comprises from about 0.2 weight percent to about 50 weight percent Ca and from about 0.5 weight percent to about 65 weight percent Si.

22. The cementicious material of claim 19, wherein the stainless steel slag further comprises magnesium, iron, manganese, titanium, sulfur, chromium and nickel.

23. The cementicious material of claim 19, wherein the stainless steel slag further comprises from about 0.1 weight percent to about 5 weight percent Mg, from about 0.1 weight percent to about 6 weight percent Fe, from about 0.1 weight percent to about 1 weight percent Mn, from about 0.1 weight percent to about 0.5 weight percent Ti, from about 0.01 weight percent to about 2.5 weight percent S, from about 0.3 weight percent to about 5 weight percent Cr, and from about 0.01 weight percent to about 1 weight percent Ni.

24. The cementicious material of claim 1, wherein the stainless steel slag comprises a silicate including at least one element selected from calcium, magnesium, iron, aluminum, manganese, titanium, sulfur, chromium and/or nickel.

25. The cementicious material of claim 1, wherein the stainless steel slag comprises an oxide including at least one element selected from calcium, silicon, magnesium, iron, aluminum, manganese, titanium, sulfur, chromium and/or nickel.

26. The cementicious material of claim 1, wherein the stainless steel slag has an average particle size of less than about 100 micrometers.

27. The cementicious material of claim 26, wherein the stainless steel slag has an average particle size of from about 1 to about 50 micrometers.

28. The cementicious material of claim 1, further comprising hydraulic cement.

29. The cementicious material of claim 26, wherein the hydraulic cement comprises Portland cement.

30. A concrete material comprising, a cementicious material comprising stainless steel slag, a geopolymer and hydraulic cement.

31. The concrete material of claim 30, wherein the hydraulic cement is Portland cement.

32. The concrete material of claim 30, further comprising sand, aggregate, plasticizers and/or fibers.

33. The concrete material of claim 30, wherein the cementicious material comprises from about 10 to about 30 weight percent of the concrete material.

34. The concrete material of claim 30, wherein the geopolymer comprises aluminum silicate and/or magnesium silicate.

35. The concrete material of claim 30, wherein the stainless steel slag comprises a silicate including at least one element selected from calcium, magnesium, iron, aluminum, manganese, titanium, sulfur, chromium and/or nickel; or an oxide including at least one element selected from calcium, silicon, magnesium, iron, aluminum, manganese, titanium, sulfur, chromium and/or nickel.

36. The concrete material of claim 30, wherein the geopolymer is provided from solid and liquid constituents.

37. The concrete material of claim 30, wherein the geopolymer is provided from solid constituents.

38. A reacted mixture of a geopolymer, stainless steel slag and water.

39. The reacted mixture of claim 38, further comprising hydraulic cement.

40. The reacted mixture of claim 38, wherein the hydraulic cement is Portland cement.

41. A method of making reacted cementicious material, the method comprising combining stainless steel slag, geopolymer and water to form a reacted mixture.

42. The method of claim 41, further comprising combining hydraulic cement to form the reacted mixture.

43. The method of claim 41, wherein the geopolymer is provided from solid and liquid constituents.

44. The method of claim 43, wherein the stainless steel slag and the solid constituent of the geopolymer are combined as a solid mixture, the water and the liquid constituent of the geopolymer are combined as a liquid mixture, and the solid mixture and liquid mixture are combined.

45. The method of claim 44, further comprising combining hydraulic cement to the solid mixture.

* * * * *